United States Patent [19]
Miller

[11] Patent Number: 5,889,908
[45] Date of Patent: Mar. 30, 1999

[54] 1XN FIBER OPTIC COUPLER/SPLITTER

[75] Inventor: William J. Miller, Corning, N.Y.

[73] Assignee: Corning Incorporated, Corning, N.Y.

[21] Appl. No.: 95,872

[22] Filed: Jun. 10, 1998

Related U.S. Application Data

[60] Provisional application No. 60/054,412 Jul. 31, 1997.

[51] Int. Cl.⁶ ........................................... G02B 6/38
[52] U.S. Cl. ................................. 385/46; 65/408
[58] Field of Search ..................... 385/43–46, 123, 385/142, 144, 39, 42, 11; 65/408, 409, 410; 372/6

[56] References Cited

U.S. PATENT DOCUMENTS

| | | | |
|---|---|---|---|
| Re. 35,138 | 1/1996 | Berkey et al. | 156/250 |
| 5,011,251 | 4/1991 | Miller et al. | 385/43 |
| 5,104,434 | 4/1992 | Berkey et al. | 65/410 |
| 5,268,979 | 12/1993 | Weidman | 385/42 |
| 5,295,210 | 3/1994 | Nolan et al. | 385/43 |
| 5,295,211 | 3/1994 | Weidman | 372/6 |
| 5,647,040 | 7/1997 | Modavis et al. | 385/42 |

*Primary Examiner*—Akm E. Ullah
*Attorney, Agent, or Firm*—Daniel P. Malley

[57] ABSTRACT

The end portions of a plurality of optical optical fibers are stripped; the coated portions of the fibers constituting pigtails. The stripped portion of one of the fibers is fused to an uncoated fiber section having a diameter that is larger than that of the stripped fiber end portions. A fiber optic coupler preform is made by surrounding the uncoated fiber section with the stripped portions of the remaining fibers to form a close-packed fiber array. At least a portion of the overlapping region of the uncoated fiber section and the stripped end portions is heated and drawn to induce the coupling of optical signals between the uncoated fiber section and the stripped portions.

27 Claims, 8 Drawing Sheets

FIG. 3
FIG. 4
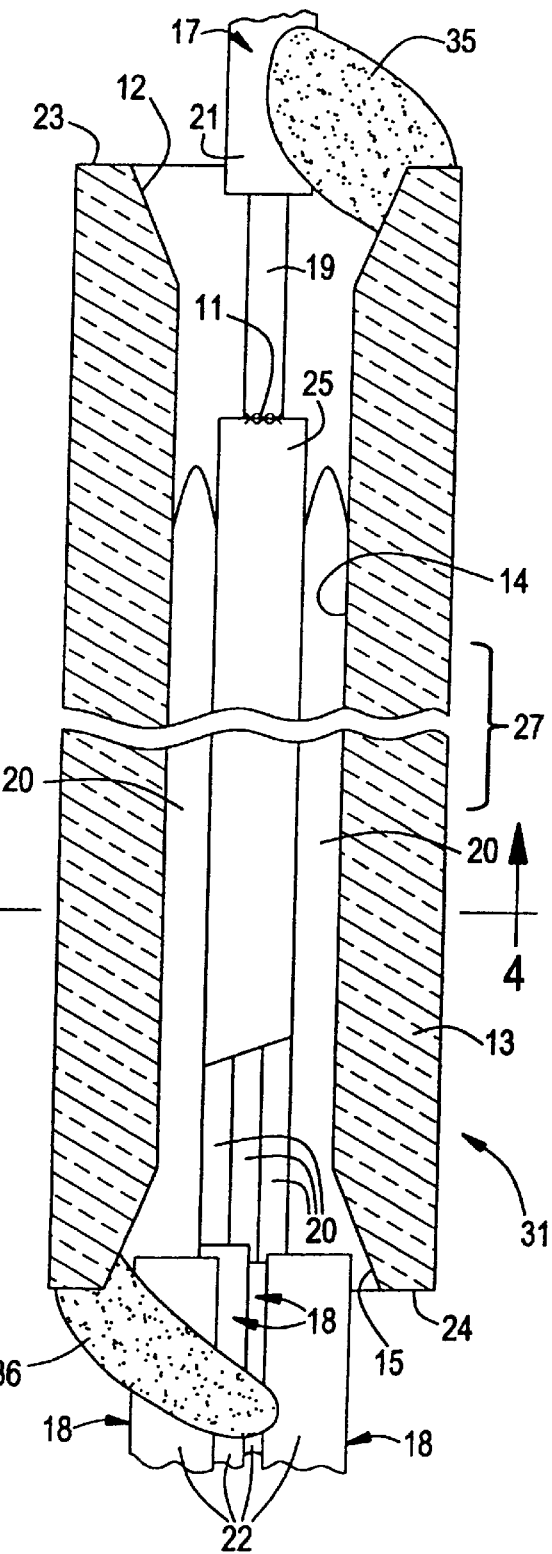
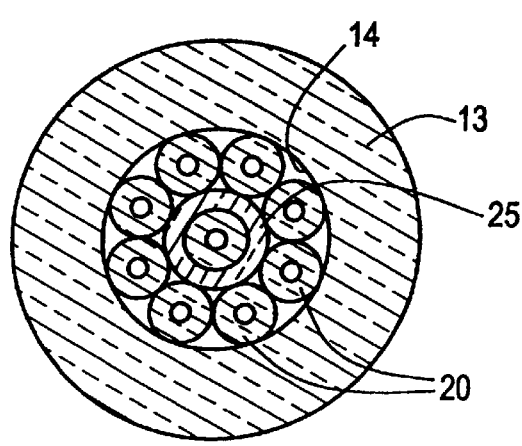

1×N FIBER OPTIC COUPLER/SPLITTER

BACKGROUND OF THE INVENTION

This application is based upon the provisional application Ser. No. 60/054,412, filed Jul. 31, 1997, which we claim as the priority date of this application.

This invention relates to fiber optic couplers and, more particularly, to 1×N couplers (N>2) that are capable of coupling substantially equal amounts of power from an input optical fiber to three or more output optical fibers; it also relates to methods of making such couplers. "Fused fiber couplers" have been formed by positioning a plurality of fibers in a side-by-side relationship along a suitable length thereof and fusing the claddings together to secure the fibers and reduce the spacings between the cores. Various coupler properties can be improved by inserting the fibers into a capillary tube prior to heating and stretching the fibers, thereby resulting in the formation of an "overclad coupler". To form an overclad coupler, the fibers are inserted into a glass overclad tube, the tube is evacuated, and its midregion is heated and collapsed onto the fibers. The central portion of the midregion is thereafter drawn down to that diameter and coupling length which is necessary to obtain the desired coupling. The present invention relates to both fused fiber couplers and overclad couplers.

Fiber optic couplers that are capable of coupling light from a centrally located input optical fiber to a plurality of output optical fibers that surround the input fiber are well known. It has been known that coupling characteristics are affected by the spacing between the output fibers. Substantially equal coupling ratios require equal fiber spacing. Six output optical fibers fit around another fiber of equal diameter to form a close packed array. However, for many purposes, devices other than 1×6 couplers, for example 1×4 couplers or 1×8 couplers, are required.

One fiber spacing technique involves gluing each output fiber to the input fiber so that each output fiber is properly located about the circumference of the input fiber. This method is very tedious and time consuming and therefore unsuitable for commercial production.

U.S. Pat. No. 5,017,206 teaches a method of making a 1×N fiber optic coupler, wherein N is not equal to 6, by assembling a coupler preform comprising two concentric glass tubes having a gap therebetween. The shape and/or size of the inner tube relative to the shape and/or size of the outer tube is such that a plurality of output optical fibers can be equally spaced in the gap. If the inner surface of the outer tube and the outer surface of the inner tube are circular in cross-section, N must be greater than 6. An input optical fiber is disposed in the centrally located aperture in the inner tube. The input and output fibers extend through the midregion of the resultant coupler preform. The midregion is heated to collapse it about the fibers, and the central portion of the midregion is stretched to reduce the diameter thereof over a predetermined length. A spacer tube having an outside diameter of 205 Tm and an inside diameter of 130 Tm can be used to form a 1×8 coupler from commercially available optical fibers having an outside diameter of 125 Tm. The eight output fibers just fit around the spacer tube, and the input fiber fits in the spacer tube aperture. However, this embodiment of 1×8 coupler is difficult to implement. First, it is difficult to make the spacer tube as it is very small in diameter and has an extremely small wall thickness. Moreover, it is very difficult for a technician to insert the input fiber into the spacer tube. The tube wall is so thin that that part of the spacer tube that is grasped by a technician collapses to an elliptical cross-section. Also, the fiber can be damaged by the spacer tube as the technician is inserting the fiber into the spacer tube. The difficulty encountered in threading the input fiber into the spacer tube makes the process more labor intensive and adds to the cost of making the coupler.

When making 1×8 couplers by the aforementioned technique employing a spacer tube between input and output fibers, it has been conventional practice to glue the ends of the overclad tube to the fibers to improve the pull strength of those portions of the fibers that extend from the coupler. It is noted that the portion of the spacer tube that will be in the midregion of the coupler preform cannot be glued to the input fiber as the midregion is subjected to a temperature sufficient to burn the glue and ruin the coupler. Also, the glue would block evacuation of air during the tube collapse step. However, since the spacing between the input fiber and the spacer tube is extremely small, glue applied to an end of the spacer tube cannot flow between that tube and the input fiber. Therefore, an insufficient amount of glue contacts the input fiber to provide it with adequate pull strength.

To increase pull strength of the input fiber, the single spacer tube is replaced by a short length and a longer length of spacer tube. See U.S. Pat. No. 5,351,326. A drop of glue is applied to a portion of the uncoated end of the input fiber adjacent its coating, and it is inserted into the short piece of spacer tube. The glue then occupies the space between the fiber and spacer short tube. After the glue is cured, the remaining uncoated portion of the input fiber is inserted into the longer piece of spacer tube. The longer piece of spacer tube is not glued to the input fiber so that the space between them can therefore be evacuated. The length of the shorter spacer tube is sufficiently short that it is not located in the midregion of the coupler preform. The length of the longer spacer tube is sufficiently long that it extends entirely through the preform midregion. Input fiber pull strength is improved; however, it is a labor intensive process.

Another technique for making 1×8 couplers involves reducing the cross-sectional area of the eight output optical fibers. Methods of reducing the cross-sectional area of a fiber include etching, machining, and drawing. Such methods are difficult to control and cause the reduced diameter portion of the fiber to become fragile. Moreover, the refractive index of the central, large diameter fiber is the same as that of the cladding of the etched, small diameter fibers.

SUMMARY OF THE INVENTION

It is therefore an object of the present invention to provide an improved method of forming a 1×N fiber optic coupler (N>3). A further object is to provide a method that overcomes the heretofore noted disadvantages of prior art methods. Another object is to provide a method of forming a 1×N fiber optic coupler that is less labor intensive and therefore more economical to implement. Yet another object is to provide a 1×N fiber optic coupler in which the centrally located input optical fiber exhibits improved pull strength, whereby the coupler is less likely to fail. Another object is to provide a method of forming a 1×N fiber optic coupler preform in which the output optical fibers are very accurately located with respect to eachother and with respect to the centrally located input optical fiber.

The present invention relates to a fiber optic coupler and to a method of making it.

The method includes the step of fusing a pigtail-type optical fiber of diameter di to at least one end of an uncoated fiber section having a diameter $d_2$ to form a first composite fiber. Diameter $d_1$ is different from diameter $d_2$. That portion of the pigtail-type optical fiber opposite the fiber section has protective coating thereon. At least one additional optical fiber having a coated fiber pigtail extending from at least one end thereof is also provided. The uncoated fiber section is disposed adjacent to the additional optical fiber, and at least a portion of the overlapping region of the uncoated fiber section and the additional optical fiber is heated and stretched to induce the coupling of optical signals between the fibers.

The at least one additional fiber can be formed by stripping coating from the end portions of a plurality of fibers. Prior to the heating step, the fibers can be arranged such that the uncoated fiber section is surrounded by the stripped portions of the remaining fibers to form a close-packed fiber array. 1×N couplers such as 1×8 couplers can be made in this fashion. If some of the surrounding fibers are spacer fibers having no light conducting core, couplers of the 1×4 type can be formed.

The method of the invention is also useful for making 2×2 couplers. In this embodiment, the first composite fiber includes an uncoated fiber section having a pigtail-type optical fiber fused to both ends thereof. The additional fiber is a second composite fiber identical to the first composite fiber.

Overclad couplers can be formed by the method of the invention. The the step of disposing the fibers in position to apply heat thereto can comprise inserting the first composite fiber and the additional fiber into the bore of a glass tube having a funnel at a first end thereof. The glass tube is heated to collapse it onto the fibers contained therein, and the tube is stretched along with the fibers.

In accordance with a further aspect of the invention, an overclad fiber optic coupler is formed by providing a glass tube having a longitudinal bore and at least one funnel extending from the bore to a first end of the tube. The bare portion of a first optical fiber is inserted into the tube bore. Coating is stripped from the end portions of a plurality of glass fibers, at least some of which are optical fibers. One of the plurality of fibers is inserted into each of a plurality of feed tubes. The feed tubes are disposed such that their ends are spaced from the first end of the glass tube, and the stripped ends of the fibers extend into the funnel. The feed tubes are advanced toward the glass tube whereby the fibers advance further into the funnel. The feed tubes are withdrawn away from the glass tube while the fibers are simultaneously fed from the feed tubes toward the glass tube. The steps of feeding and withdrawing are repeated until the fibers are situated in the tube bore surrounding the bare portion of the first optical fiber. The glass tube is then heated, collapsed onto the fibers and stretched to form a coupler.

When standard communications-type optical fibers are employed as the plurality of fibers, the feed tubes preferably move a distance between 8 and 11 mm during the steps of advancing and withdrawing.

The fiber optic coupler in accordance with the invention comprises a first composite fiber including a pigtail-type optical fiber of diameter di fused to at least one end of an uncoated fiber section having a diameter $d_2$. That portion of the pigtail-type optical fiber opposite the fiber section has protective coating thereon. The coupler includes at least one additional optical fiber having a coated fiber pigtail extending from at least one end thereof. The uncoated optical fiber section and the additional optical fiber are optically fused together along a length sufficient to induce the coupling of optical signals between the uncoated fiber section and the stripped end portion of the additional optical fiber.

BRIEF DESCRIPTION OF THE DRAWINGS

FIG. 3 is a cross-sectional view of a coupler preform.

FIG. 4 is a cross-sectional view taken along lines 4—4 of FIG. 3.

DESCRIPTION OF THE PREFERRED EMBODIMENTS

Figure 1:
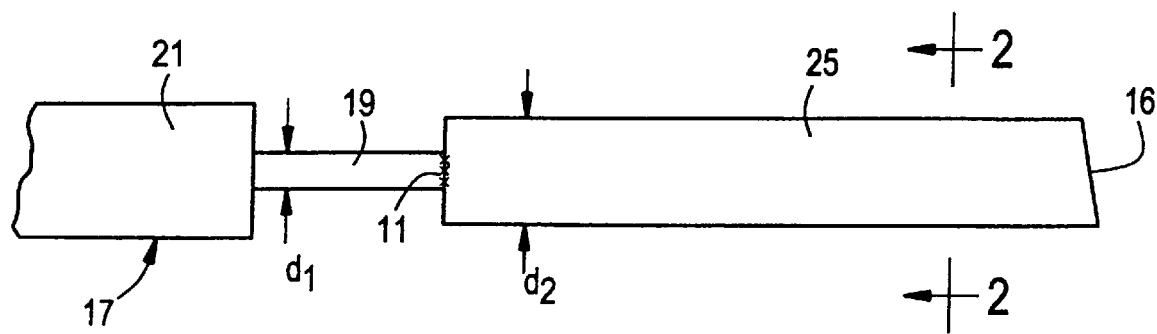
FIG. 1 shows a composite fiber for use in the method of the invention.
Figure 2:
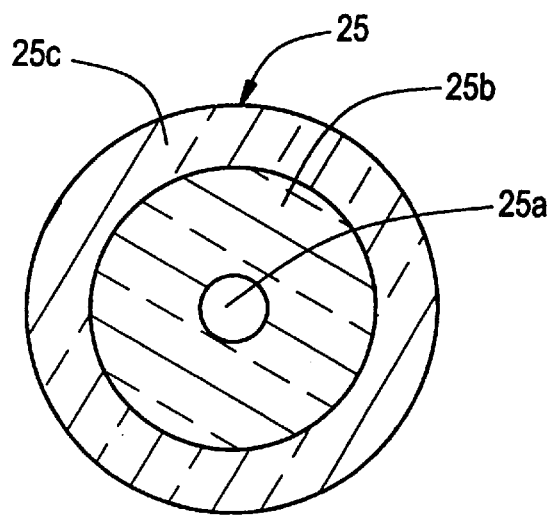
FIG. 2 is a cross-sectional view taken along lines 2—2 of FIG. 1.

The drawings are not intended to indicate scale or relative proportions of the elements shown therein.

A first embodiment of the invention relates to a method of making an overclad 1×8 fiber optic coupler by manually inserting the optical fibers into the overclad tube. An overclad coupler preform 31 is assembled as shown in FIGS. 1–4. The protective coating 22 is stripped from the ends of eight conventional single-mode coated optical fibers 18. Each fiber includes a core and cladding and a protective coating, and each is suitable for use as a pigtail that can be connected to the conventional optical fibers of a fiber optic system. The endfaces of stripped fiber portions 20 are provided with antireflection terminations that can be formed by the technique disclosed in U.S. Pat. No. 5,104,434. The stripped portions 20 of the eight coated optical fibers 18 are inserted into bore 14 of overclad tube 13 in the arrangement shown in FIG. 4, coatings 22 ending within funnel 15 as shown in FIG. 3. A fiber insertion tool can be employed in accordance with the teachings of U.S. Pat. No. 5,268,979 or published European patent application EP 0,766,108 A1.

An uncoated fiber section 25 is cut from an optical fiber that is similar to fibers 20 in that it includes a core 25a and a cladding 25b, the dimensions and composition of which are similar to those of the core and cladding of fibers 20. In addition, fiber section 25 includes an outer cladding layer 25c which has a softening point temperature lower than that of silica and which has a refractive index slightly lower than that of silica. These characteristics can be achieved by adding about 0.25–0.75 wt. % $B_2O_3$ to $SiO_2$. The diameter $d_2$ of uncoated fiber section 25 is sufficiently large that eight uncoated end portions 20 can fit around its circumference to form with section 25 a close packed array.

The protective coating is stripped from the end of a conventional single-mode coated optical fiber 17. The diameter of stripped portion 19 is $d_1$. Portion 19 is sufficiently short that it does not extend to tube midregion 27 (FIG. 3). The end of stripped portion 19 is fused to uncoated fiber section 25 at fusion joint 11. The remaining end of fiber section 25 is provided with an antireflection termination 16. Although the endface of fiber section 25 is shown as being angle cleaved, it could be another type of antireflection termination such as a ball termination. An angle cleaved endface can be formed with a commercial apparatus such as an Alcatel angle cleaver. The resultant composite fiber comprising stripped portion 19 and section 25 is inserted through funnel 12 and into the cavity at the center of fibers 20 until coating 21 is within funnel 12. Section 25 is sufficiently long that it extends entirely through tube midregion 27. Thus, only section 25, and not stripped portion 19, lies in the coupling region of the resultant coupler.

A drop 36 of glue is applied to the outer circumference of coated fibers 18 to tack them to endface 24, the glue being applied in such a manner that access from to bore 14 is not blocked. A drop 35 of glue similarly secures coated fiber 17 to endface 23. Drops 35 and 36 of glue merely secure the fibers in place during the coupler forming operation.

Figure 5:
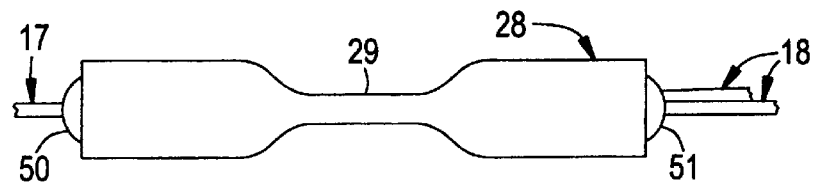
FIG. 5 shows a coupler preform after it has been stretched and sealed at its ends.
Figure 6:
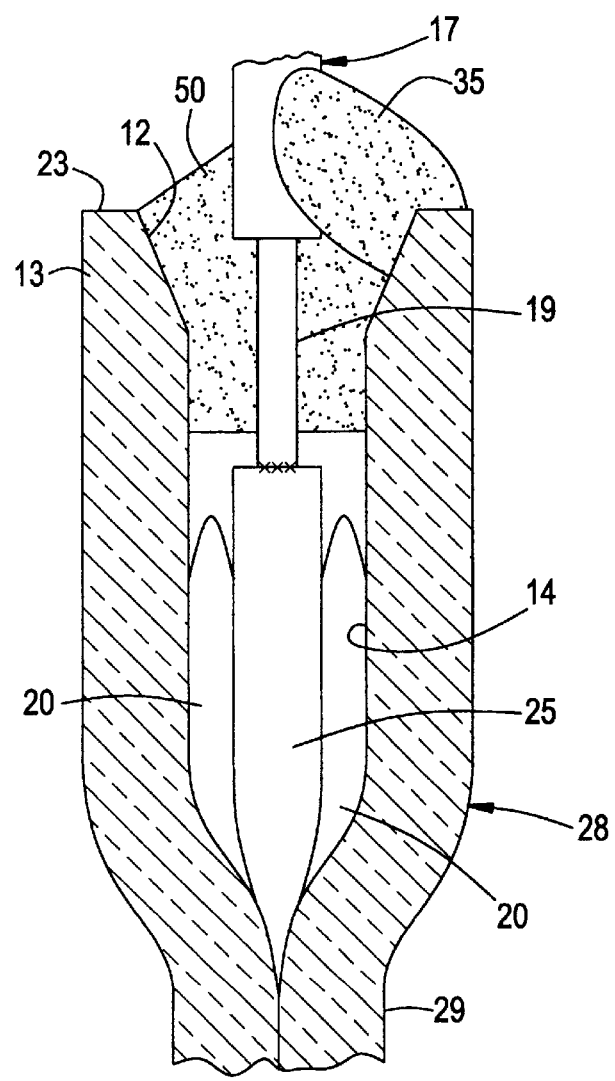
FIG. 6 is a partial cross-sectional view illustrating one-half of the overclad coupler of FIG. 5.

Coupler preform 31 can be further processed in a draw apparatus of the type disclosed in U.S. Pat. Nos. 5,017,206 and 5,268,979, which are incorporated herein by reference. Preform 31 is inserted through a ring burner and is clamped to draw chucks which are mounted on motor controlled stages. The fibers are threaded through vacuum attachments which are then sealed to the ends of preform 31. Typical vacuum attachments are disclosed in U.S. Pat. No. 5,017, 206. While preform 31 is evacuated, the ring burner heats tube 13, causing midregion 27 to collapse onto optical fibers 20. Thereafter, the center of the collapsed region is heated, and the motor controlled stages pull in opposite directions to elongate preform 31 to form fiber optic coupler 28 having neckdown region 29 (FIGS. 5 and 6).

The open space in funnels 12 and 15 is then filled with glue 50 and 51, respectively, to increase the pull strength of the optical fiber pigtails extending from the ends of the coupler. Glue can be applied by filling a syringe with glue and inserting its applicator needle into a funnel. A sufficient amount of glue is injected into the funnel to cover the bare regions of the fibers that extend into the funnel. Before the glue is cured, a sufficient amount of time is allowed to pass to enable the glue to wick along the wall of the funnel and bore adjacent the optical fibers. Preferably, the glue is curable by UV light, and a beam of UV light is directed through tube 13 just above fusion joint 11 to prevent the flow of glue beyond the point shown in FIG. 6. If glue reaches the ends of fibers 20, it reduces the effectiveness of the antireflective terminations thereon. Glue 50 adheres to most of the length of stripped portion 19, whereby most of an axial force that is applied to coated fiber 17 is transferred to tube 13 and does not reach those portions of the fibers in and near the coupling region.

Figure 7:
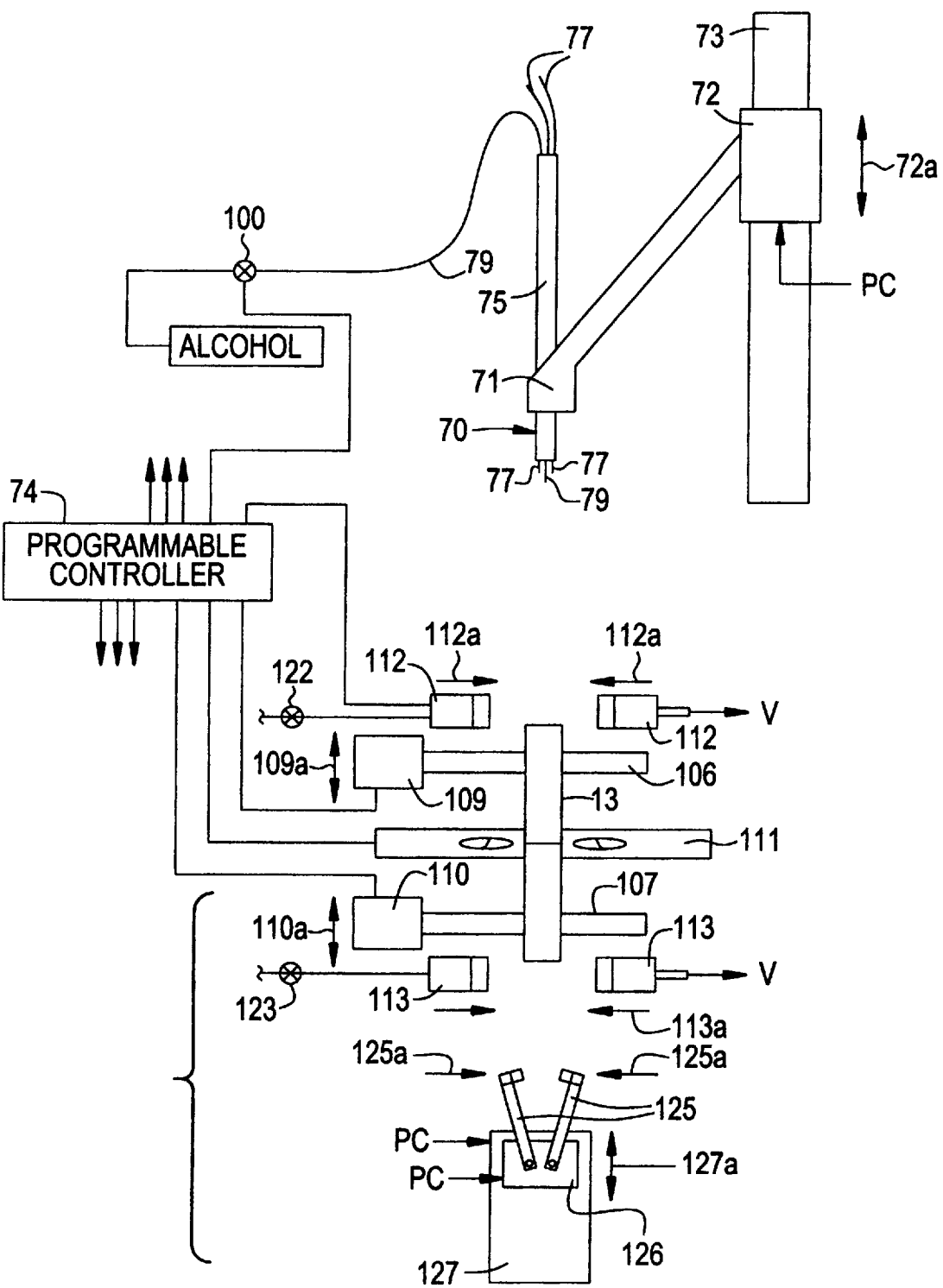
FIG. 7 shows an apparatus for feeding fibers to a coupler forming apparatus.
Figure 8:
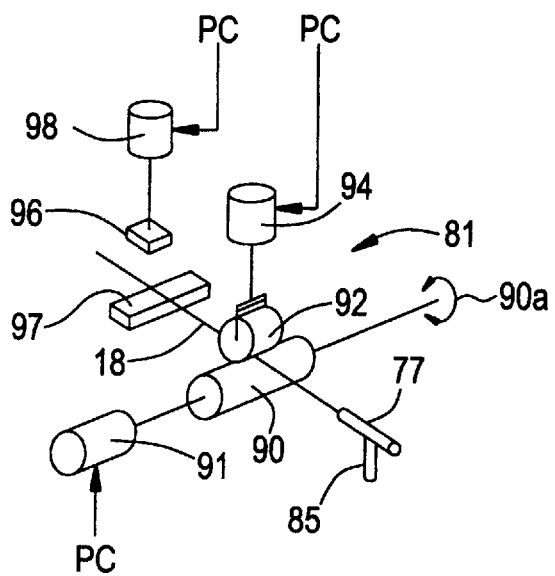
FIG. 8 shows a mechanism for feeding coated optical fibers to the apparatus of FIG. 7.
Figure 9:
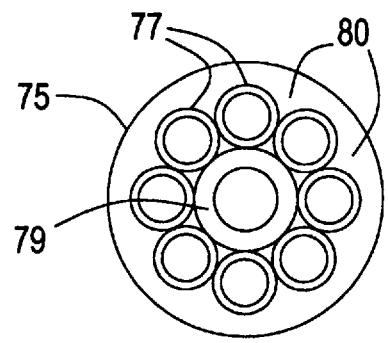
FIG. 9 is an end view of the retaining tube of FIG. 7.

The 1×8 coupler could also be made by the semi-automated apparatus shown in FIGS. 7–11. In these figures and in FIGS. 12a, 12b and 12c, elements similar to above-described elements are represented by the same reference numerals. Drops 35 and 36 of tacking glue are not needed in this embodiment. Fiber insertion fixture 70 is affixed to one end of a support arm 71, the other end of which is connected to a stage 72 which is movable along track 73 as indicated by arrow 72a. The vertical position of stage 72 is determined by programmable controller 74. Most of the elements of FIGS. 7 and 8 that are controlled by controller 74 are provided with an arrow marked PC. Fixture 70 includes a retaining tube 75 in which are disposed fiber guide tubes 77 and alcohol dispensing tube 79. For the sake of clarity, only two of the eight fiber guide tubes are shown in FIG. 7. Tubes 77 and 79 are secured to the end of tube 75 by epoxy 80 (FIG. 9).

The end of each fiber guide tube 77 remote from arm 71 is positioned adjacent a fiber feed mechanism 81 (FIG. 8). Fiber reels (not shown) are nonrotatably positioned so that fibers 18 that are coiled thereon pay out to feed mechanism 81. Fibers 18 pass through the feed mechanism and into guide tubes 77. Nitrogen is fed through tubes 85 into fiber guide tubes 77. Nitrogen exiting the fiber input ends of the guide tubes blow dust and debris from the fibers before they enter the guide tubes. Nitrogen which flows through guide tubes 77 to the ends thereof adjacent arm 71 lowers the friction between the guide tubes and the fibers as they traverse the guide tubes.

Fiber feed mechanism 81 includes a roller 90 which can be rotated in either direction by a stepping motor 91. Located above roller 90 are idler rollers 92 (only one of which is shown) which are actuated by gas operated cyclinders 94. Rollers 92 are normally biased away from roller 90. To deliver a fiber 18 to a tube 77, cyclinder 94 is actuated, thereby lowering roller 92 onto roller 90. Motor 91 turns roller 90 in the clockwise direction of arrow 90a. When a sufficient amount of fiber has been delivered, idler roller 92 retracts from main roller 90, and cyclinder 98 is actuated to lower clamp 96 against bar 97 to prevent further movement of the fiber. The surfaces of rollers 90 and 92 and the surfaces of clamp 96 and bar 97 are coated with a resilient material to avoid damaging the fibers.

Figure 10:
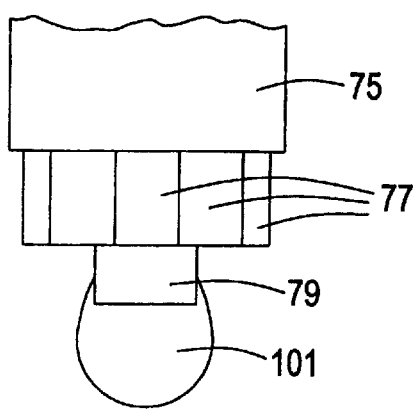
FIG. 10 is a detailed view of the end of the retaining tube of FIG. 7.

Alcohol from a pressurized source is fed to dispensing tube 79 by way of valve 100. A drop 101 of alcohol is shown in FIG. 10 extending from tube 79.

A coupler drawing apparatus 105 including chucks 106 and 107 is located below fiber insertion fixture 70. The ends of capillary tube 13 can be manually inserted in the chucks. Chucks 106 and 107 are connected to stages 109 and 110, respectively, each of which is movable in an upward or downward direction as indicated by arrows 109a and 110a. After fibers have been inserted into tube 108, vacuum seals 112 and 113 move in the direction indicated by arrows 112a and 113a to seal the ends of tube 108 within the evacuated cavity.

Figure 11:
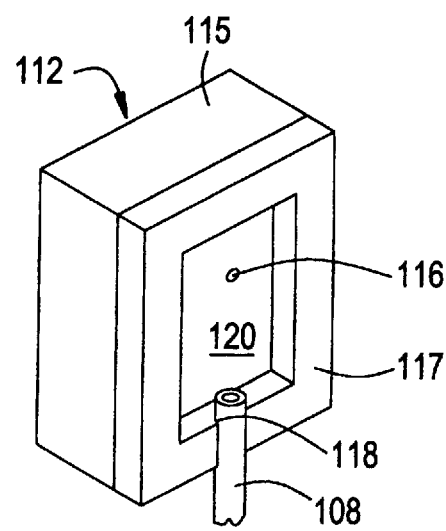
FIG. 11 is an isometric view of a vacuum seal employed in the apparatus of FIG. 7.

The upper left vacuum seal 112 is shown in FIG. 11. It consists of a metal back plate 115 having a bore 116 therein which is adapted to be connected to a bleed valve 122. Surrounding the periphery of the face of back plate 115 is an elastomeric seal 117 having a semi-cylindrical slot 118 therein which is adapted to receive the end of capillary tube 108. The central portion of seal 117 is hollow so that it forms, along with the face of back plate 115, a cavity 120. The bore 116 of the upper left vacuum seal is connected to a bleed valve 122 (FIG. 7), and that of the upper right vacuum seal is connected to a vacuum source V. Similarly, one of the vacuum seals 113 is connected to a vacuum source V, and the other vacuum seal 113 is connected to bleed valve 123.

To form a 1×8 coupler in the apparatus of FIG. 7, capillary tube 13 is inserted into chucks 106 and 107. A length of fiber 18 sufficient to form a stripped, ball terminated end is delivered from fiber guide tube 77. The end stripping and ball termination operations can be performed mechanically in accordance with the teachings of published international application WO 97/11917. Alternatively, a sufficient length of fiber 18 can be supplied from guide tube 77 to permit these operations to be manually performed. The stripped, terminated end of that particular fiber 18 is retracted into its guide tube 77. The remaining seven fibers 18 are then similarly end stripped, ball terminated and retracted into their guide tubes 77.

A bottom clamp 125, which is actuated by mechanism 126, is situated on a stage 127 that moves vertically as shown by arrow 127a (FIG. 7).

Figure 12A:
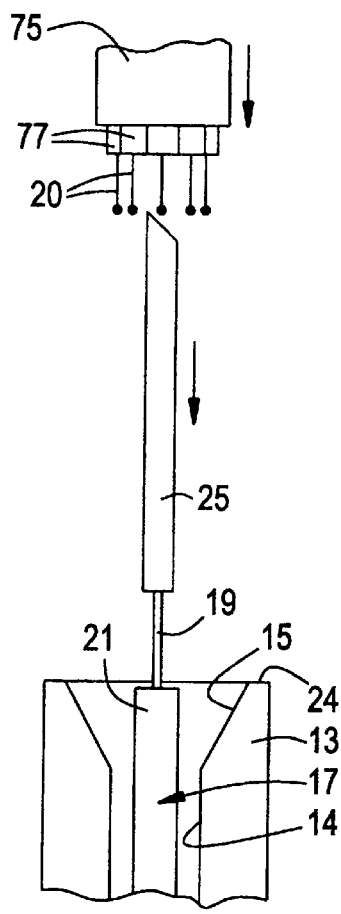
FIGS. 12a, 12b, 12c and 12d are partial cross-sectional views of an overclad tube illustrating the operation of the apparatus of FIG. 7.
Figure 12B:
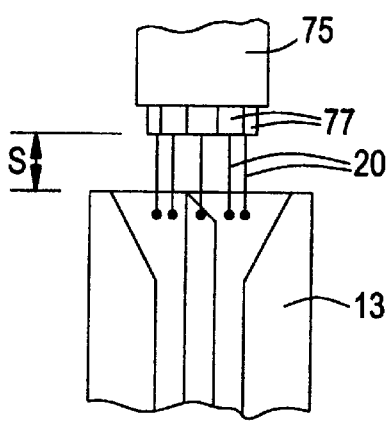
Figure 12C:
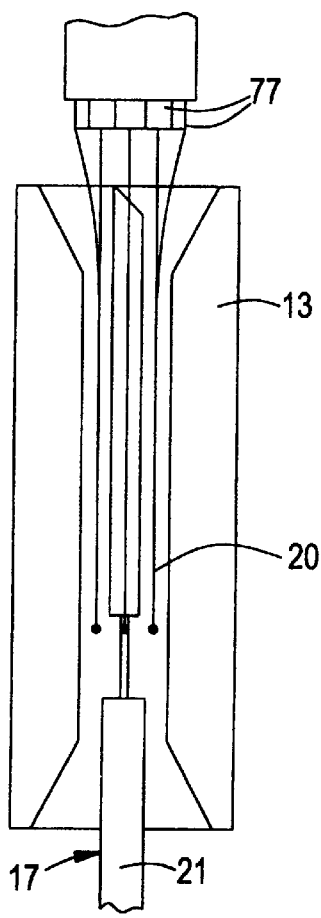
Figure 12D:
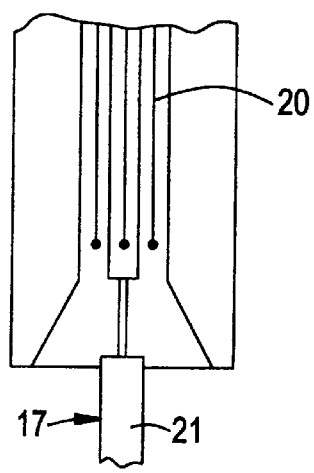

Coated fiber 17 is end stripped, and fiber section 25 is fused to stripped portion 19 as described above in conjunction with FIG. 1. Fiber section 25 is manually inserted into the bottom end of capillary tube 13, and coating 21 of coated fiber 17 is threaded into the tube until coating 21 is located in funnel 15 as shown in FIG. 12a. Clamp 125 is closed on that portion of coated fiber 17 extending from the bottom of tube 13. The operator makes an entry in the programable controller indicating that, at the present vertical position of clamp 125, the end of coating 21 is aligned with the top end of tube 13. The controller thus registers the vertical location of fiber section 25. Retaining tube 75 is moved downwardly until tubes 77 are about 8–11 mm above the cleaved end 16 of fiber section 25. Tube 79 is not shown in FIGS. 12a, 12b and 12c. Coated fibers 17 are simultaneously fed through tubes 77 until the ball terminated tips of stripped regions 20 are positioned around the cleaved end of fiber section 25 as shown in FIG. 12a.

Bottom clamp 125 and retaining tube 75 move downwardly under the control of the programable controller at approximately the same rate until fibers 20 are located just inside funnel 15 (FIG. 12b), and the distance s 12b is 8–11 mm. Retaining tube 75 is moved downwardly about 5–8 mm to cause stripped regions 20 to simultaneously begin to enter funnel 15. Retaining tube 75 is then moved upwardly about 5–8 mm while fibers 18 are fed into the guide tubes at the same rate that tube 75 moves upwardly so that the ends of fiber portions 20 that are in tube 13 remain stationary. The retaining tube again moves about 5–8 mm downwardly to cause fiber portions 20 to move farther into tube bore 14. Drops of alcohol are fed from tube 79 as the stripped regions 20 of fibers 18 are lowered into capillary tube bore 14. The process of inserting fiber portions 20 in 5–8 mm increments is continued until only one additional 5–8 mm insertion is required in order to place fiber sections in their proper position in the coupler preform (see FIG. 12c). During the last 5–8 mm movement of portions 20 into bore 14, fiber section 25 moves to its final vertical position that is illustrated in FIG. 3. This final movement of section 25, during which it moves downwardly a greater distance than fiber portions 20, all of the fibers in the tube are straightened. The fiber straightening affect is caused by relative movement of fiber section 25 and fibers 20 as fiber section 25 moves downwardly a greater distance than fibers 20.

It was found that standard telecommunications optical fibers could be best inserted into tube 13 when distance s was 8–11 mm. When d was less than 8 mm, some of the fibers broke as their ends encountered the tube funnel 15 since there was an insufficient length of the fibers protruding from tubes 77 to permit the fibers to sufficiently flex as they encountered the funnel. If the distance s was greater than 11 mm, the fibers could rotate around eachother and would not enter the tube in a controlled state, thus causing the fibers to break. It is expected that the distance s could be outside the range of 8–11 mm if optical fibers having a greater stiffness or a lesser stiffness than that of standard telecommunications optical fibers were employed.

The method whereby retaining tube 75 reciprocated upwardly and downwardly during the insertion of the fibers into the tube bore at increments of about 5–8 mm is beneficial in that fiber bending is controlled during insertion, i.e. the fibers are kept sufficiently stiff that they insert in a relatively straight condition, whereby they exhibit low twist.

After the bare regions of all fibers are located in the bore of tube 13, bottom vacuum seal 113 is closed, and alcohol is evacuated from the bore. Air is pulled through the tube bore for about 20 seconds. Air is also bled into the left vacuum seal 113 through valve 123.

The retaining tube 75 is raised, and the fibers 18 are fed through tubes 77 at the same rate until the bottoms of tubes 77 and 79 clear the top vacuum seal 112. The top vacuum seal is closed and a vacuum is pulled within the vacuum cavity above the top of tube 13. Air is bled through valve 122 and into left vacuum seal 112 while the other side of the seal is evacauated. This generates a fast moving air stream that removes any alcohol that has accumulated on the top of tube 13. This aspirator action occurs not only during alcohol removal but also during the application of vacuum during the subsequent steps of tube collapse and stretch; it is noted that only a low level of vacuum is required for these two steps.

Burner 111 is preferably a split burner that can close around tube 13 at the appropriate time in the coupler fabrication process. With methane and a reduced level of oxygen flowing, the burner halves are ignited and move in and close around tube 13. Then the flow of oxygen is increased, and the midregion of tube 13 is heated to a sufficiently high temperature to cause it to collapse onto the fibers. About 10–22 seconds later (typically 15 seconds), the top and bottom chucks are traversed in opposite directions and a tapered region is formed. Alternatively, tube 13 can be reheated prior to traversing the chucks to form the tapered region.

The stretching distance was determined as follows. A coupler is initially elongated by some distance determined by previous experience. The optical characteristics of the resultant device are measured, and the stretching or elongation distance of the subsequently made coupler is adjusted in such a manner as to more nearly achieve the desired characteristics. By this process, the optimal stretching distance is achieved. Thereafter, all couplers of that type are stretched the optimal distance in order to achieve the desired optical characteristics. However, process parameters such as the elongation distance can be fine tuned as a result of optical characterization of the produced couplers.

The vacuum seals are opened, and epoxy is dispensed at the ends of the coupler. UV light is directed at the applied epoxy to cure it.

A jet of room temperature air is directed onto the coupler for about 10 seconds to cool it. The optical measurement is then made.

The coupler body is released from the draw chucks, and the fiber pigtails at the top of the coupler are metered out by the fiber feed mechanism until about 2 m of fiber extends from the top end of the coupler. The output leads are then severed, and the coupler is removed from the draw apparatus.

Some or all of the functions that are indicated as being under the control of the programmable computer may be manually performed by utilizing electrical switches.

Various fiber packing arrangements other than those discussed above can be employed. A 2×2 coupler can be formed from the coupler preform of FIG. 13. A first fiber section 140 is fused at one end to stripped fiber portion 141 of coated fiber 142 and at the other end to stripped fiber portion 143 of coated fiber 144. Similarly, fiber section 146 is fused at one end to stripped fiber portion 147 of coated fiber 148 and at the other end to stripped fiber portion 149 of coated fiber 150. The composite fibers are threaded through bore 14 until fiber sections 140 and 146 are centered in bore 14 of tube 13. Fiber sections 140 and 146 can be threaded into bore 14 either simultaneously or consecutively. The diameters of fiber sections 140 and 146 are the same as the diameters of the coatings of coated fibers 142, 144, 148 and 150. The diameter of bore 14 is made slightly larger than twice the diameter of fiber section 140. Thus, the two coatings can easily be threaded through the bore. The combined diameters of fibers 140 and 146 is such that there is very little excess space within the bore. Since the walls of aperture 14 undergo less inward movement before total collapse is achieved, and since fibers 140 and 141 move a relatively short distance during the tube collapse step to achieve mutual contact, the tube collapse step is more likely to be accomplished without matrix glass from the tube flowing between the fibers and without the deviation of the fibers from a linear path. The embodiment of FIG. 13 should therefore more consistently produce 2×2 couplers having low loss and predetermined coupling ratio.

Figure 14:
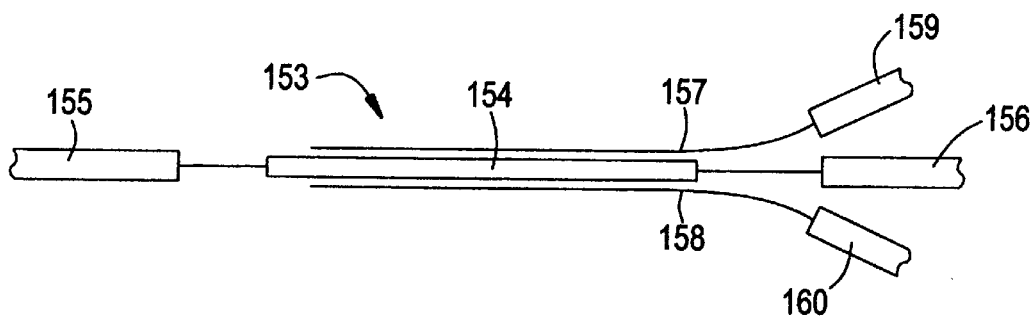
FIG. 14 schematically illustrates a 1×9 coupler.

FIG. 14 schematically shows another embodiment wherein the coupler 153 is a fused fiber type coupler having no overclad tube. One fiber pigtail 155 is fused to one end of large diameter fiber section 154, and another fiber pigtail 156 is fused to the other end thereof. Only two of the eight stripped fiber portions that are arranged around central fiber section 154 are shown. Fiber portions 157 and 158 are associated with pigtails 159 and 160, respectively. This type of coupler could function as a 1×9 wherein power substantially equally couples to all nine output pigtails at one or two bands of wavelengths. Alternatively, the coupler could function as a tap wherein a small amount of power is coupled to the eight pigtails of the stripped fiber portions surrounding the central fiber section, and most of the output power remains in central fiber section 154 propagates from pigtail 156.

The modification discussed below in connection with FIG. 15 can be used in the manufacture of other kinds of 1×N couplers or splitters. Instead of eight stripped fiber portions 20 around fiber section 25 there are only four. Four spacer fibers 166 are alternately disposed with the fiber portions 20 around fiber section 25. A spacer fiber has no core and can have a length that is slightly shorter than the tube. The composition of the spacer fiber is preferably such that its refractive index is the same or about the same as that of the tube 13. The spacer fibers could be formed of the same material as the tube. A coupler formed from the preform of FIG. 15 could function as a 1×4 splitter. The coupler preform could be stretched until all of the power couples from the central fiber to the three ring fibers at the wavelength or wavelengths of interest, depending on whether the device is to operate at one or two windows.

Figure 15:
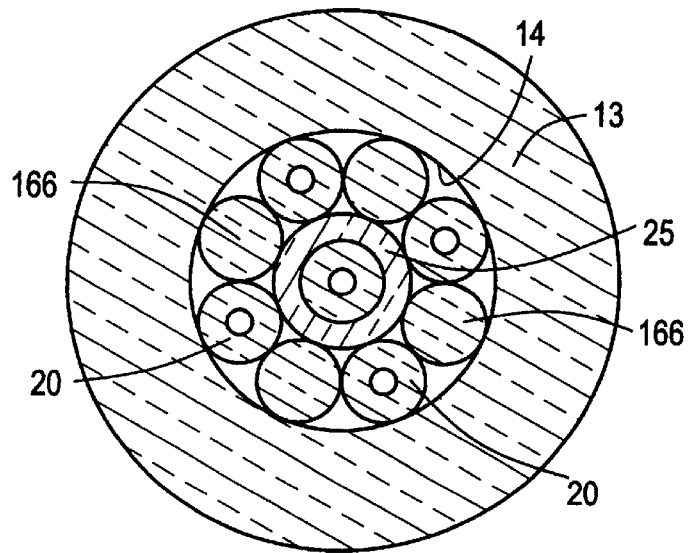
FIG. 15 is a cross-sectional view of a 1×4 coupler that includes spacer fibers.
Figure 16:
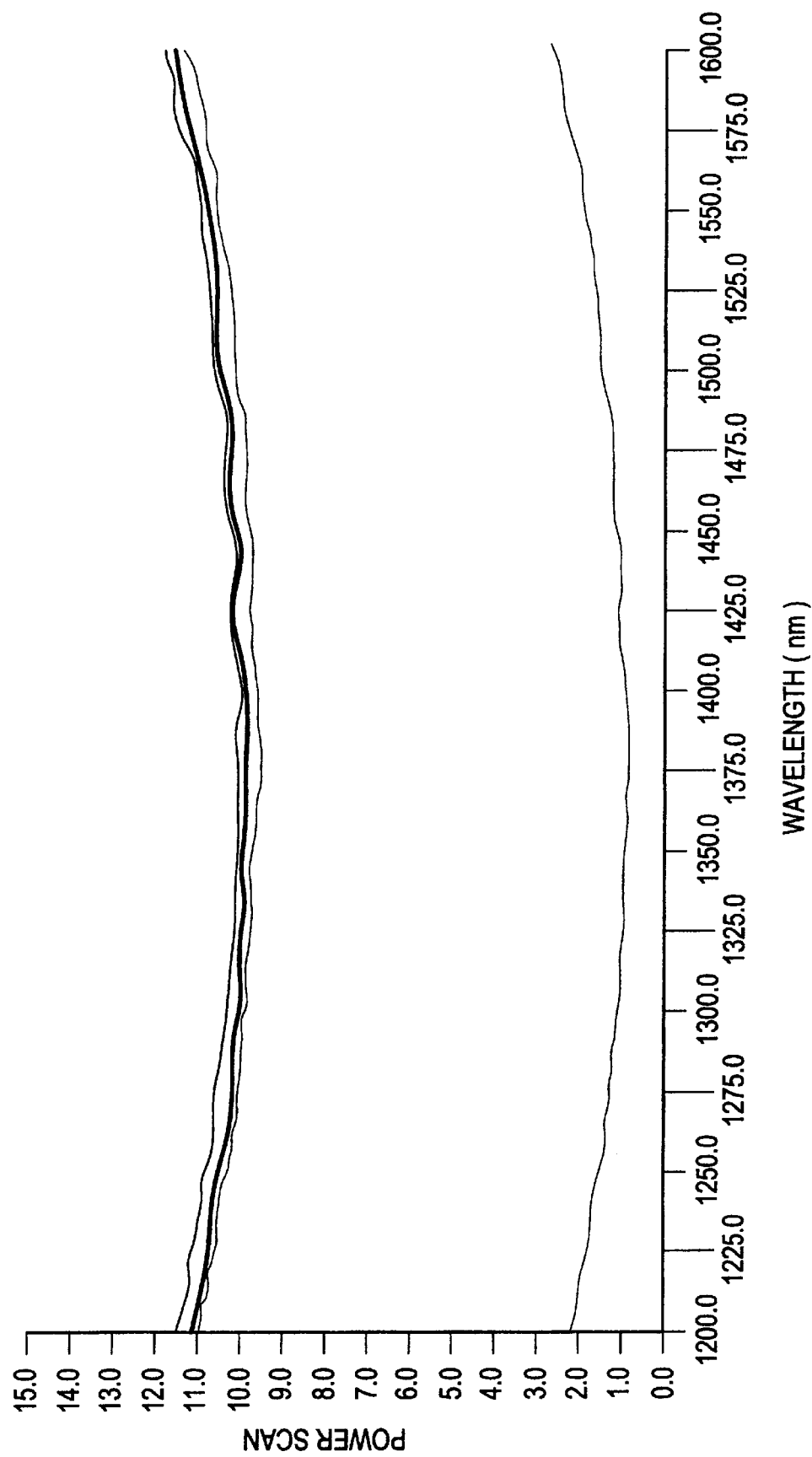
FIG. 16 is a graph illustrating spectral coupling ratio curves for a 1×8 coupler produced in accordance with the method of the present invention.

Many other kinds of couplers can be formed from preforms similar to that shown in FIG. 15. Five active fibers and five spacer fibers could be alternately disposed about a central fiber section slightly larger in diameter than fiber section 25. Such a device could function as a 1×5.

To make fused fiber couplers in the above-described 1×N configurations, the optical fibers are arranged in the relationships described above without the use of an overclad tube and are optionally twisted while they are heated and stretched.

The following specific example concerns a method of making a 1×8 splitter in the apparatus of FIGS. 7–11. A glass tube 13 having a 3.4 cm length, 2.6 mm outside diameter, and 470–475 μm longitudinal bore diameter was employed. It was formed of silica doped with about 3.5–4.0 wt. % $B_2O_3$, the composition being relatively uniform throughout its radius. Funnels 12 and 15 were formed by flowing the gas phase etchant $NF_3$ through the tube while uniformly heating the end of the tube. The funnels were about 3 mm deep, and their diameter at the tube end was about 1.8 mm.

Coated fibers 17 and 18 comprised 125 μm diameter single-mode optical fibers 19 and 20 having a 250 μm diameter urethane acrylate coatings 21 and 22, respectively. These fibers had an 8 μm diameter core of silica doped with 8.5 wt. % $GeO_2$. These fibers, which were standard telecommunication fibers, were made in accordance with the teachings of U.S. Pat. No. 5,011,251.

Eight optical fibers 18 were fed from their respective feed tubes 77 and provided with stripped ends having antireflection terminations as described above. The resultant stripped, terminated end regions were about 2.8 cm long.

Coating was stripped from the end of a 2 m long piece of coated optical fiber 17. The uncoated region was severed to form a 5 mm long stripped portion 19.

A non-conventional optical fiber was made by a process similar to that by which coated fibers 17 and 18 were made, except that its preform was provided with an additional cladding layer of silica doped with approximately 0.5 wt. % $B_2O_3$ after the conventional silica cladding layer was applied. The preform was drawn to form a reel of optical fiber having an 8 μm diameter core 25a of silica doped with 8.5 wt. % $GeO_2$, a 125 μm diameter undoped silica cladding 25b and an outer 200 μm diameter cladding 25c of silica doped with approximately 0.5 wt. % $B_2O_3$. A length of the 200 μm diameter fiber was severed from the reel and fusion spliced to stripped portion 19 of coated fiber 17. The fusion splicing operation, which was performed on an Ericsson FSU-925 fusion splicer, typically achieved splice losses less than 0.1 dB. The end of the 200 μm diameter fiber was angle cleaved to form a 18 mm long 200 μm diameter fiber section 25.

The eight stripped, terminated fiber portions 20 and the composite of stripped portion 19 and 200 μm diameter fiber section 25 were inserted into the overclad tube as described above in conjunction with FIGS. 7–12.

The burner flame heated the tube for about 18 seconds to collapse the matrix glass onto the fibers. Stages 109 and 110 were pulled in opposite directions at a combined rate of 2 cm/sec until the central portion of midregion 27 was stretched 1.74 cm.

After the coupler cooled and the vacuum chucks were removed, epoxy was injected into the funnels and was cured. The coupler was then removed from the coupler drawing apparatus 105.

Figure 13:
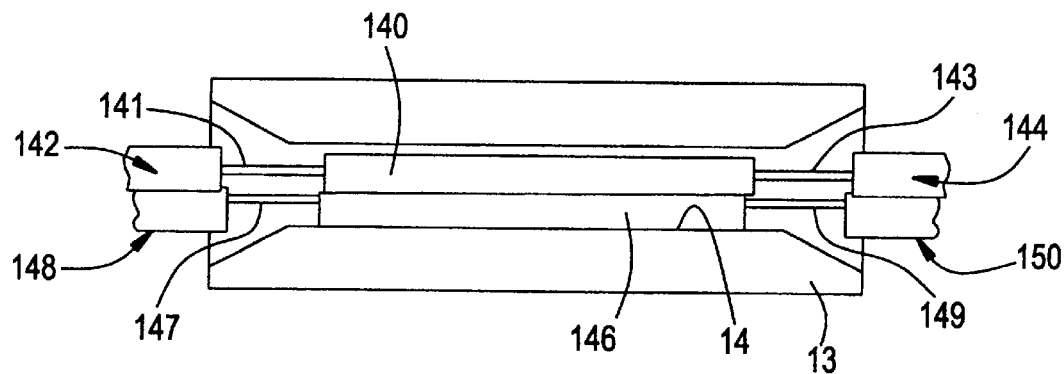
FIG. 13 is a cross-sectional view of a coupler preform for a 2×2 coupler.

FIG. 13 is a graph of insertion loss vs. wavelength for the coupler. Maximum insertion loss at 1550 nm and 1310 nm was 11.46 dB and 10.50 dB, respectively. All ports uniformity at 1550 nm and 1310 nm was 1.38 dB and 0.84 dB, respectively.

As compared with overclad 1×8 fiber optic couplers in which a glass sleeve or spacer tube surrounds the central fiber, the pull strength of pigtail 17 of a coupler made in accordance with this example is significantly improved, whereby the coupler is less likely to fail. This test was performed by making couplers without applying epoxy 50 and 51 to the funnels as shown in FIGS. 5 and 6. A jell was applied to the funnels to prevent moisture from reaching fiber portion 19 and fiber section 25. Coated fiber was pulled at greadually increasing loads until it broke. In devices made in accordance with this example, a fiber break occurred after 4–60 kpsi had been applied. For overclad 1×8 fiber optic couplers in which a glass spacer tube surrounds the central fiber, the pull strength of pigtail 17 is only in the range of 10–13 kpsi.

There is a lower cost associated with the technique of the above example since less labor is involved in fusing the two fiber sections 19 and 25 as compared with inserting a fiber into a spacer tube or etching the eight surrounding fibers to reduce their diameter, as has previously been done.

I claim:

1. A method of making a fiber optic coupler comprising
    providing a first composite fiber including an uncoated fiber section having a diameter $d_2$ and a pigtail-type optical fiber of diameter $d_1$ being fused to at least one end of said fiber section, wherein $d_1$ is different from $d_2$, that portion of said pigtail-type optical fiber opposite said fiber section having protective coating thereon,
    providing at least one additional optical fiber having a coated fiber pigtail extending from at least one end thereof,
    disposing said uncoated fiber section adjacent to said at least one additional optical fiber, and
    heating and stretching at least a portion of the overlapping region of the uncoated fiber section and at least one additional optical fiber to induce the coupling of optical signals between the uncoated fiber section and the stripped end portion of said at least one additional optical fiber.

2. The method of claim 1 wherein the step of providing a first composite fiber comprises stripping coating from the end portion of a first optical fiber having a diameter $d_1$ and fusing the end of the stripped portion of said first fiber to an uncoated optical fiber section having a diameter $d_2$.

3. The method of claim 2 wherein the step of providing at least one additional fiber comprises stripping coating from the end portions of a plurality of fibers, the coated portions of said first fiber and said plurality of fibers constituting pigtails.

4. The method of claim 3 wherein the step of disposing comprises surrounding said uncoated fiber section with the stripped portions of the remaining fibers to form a close-packed fiber array.

5. The method of claim 3 wherein the step of disposing comprises surrounding said uncoated fiber section with the stripped portions of the remaining fibers and with at least one spacer fiber to form a close-packed fiber array.

6. The method of claim 2 wherein $d_2$ is greater than $d_1$, wherein the step of providing at least one additional fiber comprises stripping coating from the end portions of eight fibers, the coated portions of said first fiber and said eight constituting pigtails, and wherein the step of disposing comprises surrounding said uncoated fiber section with the stripped portions of said eight fibers to form a close-packed fiber array.

7. The method of claim 1 wherein the step of providing at least one additional optical fiber comprises providing a second composite fiber identical to said first composite fiber.

8. The method of claim 7 wherein $d_2$ is greater than $d_1$ and wherein each of said first and second composite fibers comprises a pigtail-type optical fiber fused to both ends thereof.

9. The method of claim 1 wherein the step of disposing comprises inserting said first composite fiber and said at least one additional fiber into the bore of a glass tube having a funnel at a first end thereof, and wherein the step of heating and stretching comprises heating said tube to collapse it onto the fibers therein, and thereafter stretching said tube and the fibers therein.

10. The method of claim 9 wherein the step of providing at least one additional fiber comprises stripping coating from the end portions of a plurality of fibers, the coated portions of said first fiber and said plurality of fibers constituting pigtails.

11. The method of claim 10 wherein the step of inserting said plurality of optical fibers into the bore of said tube comprises
    inserting said uncoated fiber section into said bore,
    inserting one of said plurality of fibers into each of a plurality of feed tubes,
    disposing said plurality of feed tubes such that their ends are spaced from said first end of said glass tube and the ends of said fibers extend into said funnel,
    advancing said feed tubes toward said glass tube whereby said plurality of fibers advance further into said funnel,
    withdrawing said feed tubes away from said first end of said glass tube while simultaneously feeding said plurality of fibers from said feed tubes toward said glass tube, and
    repeating the steps of advancing and withdrawing until said fibers are situated in said tube bore.

12. The method of claim 11 wherein, during the insertion of said plurality of fibers into said tube bore, the end of said uncoated fiber section opposite said pigtail-type fiber is situated at the end of said tube.

13. The method of claim 11 wherein, during the steps of advancing and withdrawing, said feed tubes move a distance that is between 5 and 8 mm.

14. A method of making a fiber optic coupler comprising
    stripping coating from the end portion of a first optical fiber having a diameter $d_1$ and fusing the end of the stripped portion of said first fiber to an uncoated optical fiber section having a diameter $d_2$ to form a composite fiber, wherein $d_2$ is greater than $d_1$,
    stripping coating from the end portions of a plurality of fibers, the coated portions of said first fiber and said plurality of fibers constituting pigtails,
    inserting the uncoated optical fiber section of said composite fiber and the stripped portions of said plurality of fibers into the bore of a glass tube having first and second funnels at the first and second ends thereof, respectively, said stripped portions surrounding said uncoated fiber section, thereby forming a close-packed fiber array,
    heating the assembly formed by the forgoing steps to collapse at least a portion of said tube onto the fibers therein, and
    stretching at least the midportion of the collapsed region of said tube to induce the coupling of optical signals between the uncoated fiber section and the stripped portions.

15. The method of claim 14 wherein the step of inserting said plurality of optical fibers into the bore of said tube comprises
    inserting said uncoated fiber section into said bore,
    inserting one of said plurality of fibers into each of a plurality of feed tubes, disposing said plurality of feed tubes such that their ends are spaced from said first end of said tube, feeding said plurality of fibers from said feed tubes into said funnel, withdrawing said feed tubes an incremental distance away from said first end of said tube, and repeating the steps of feeding and withdrawing until said fibers are situated in said tube bore.

16. The method of claim 15 wherein, during the insertion of said plurality of fibers into said tube bore, the end of said uncoated fiber section opposite said pigtail-type fiber is situated at the end of said tube.

17. The method of claim 15 wherein the incremental distance that said plurality of fibers is fed into said tube during each step of feeding is between 5 and 8 mm.

18. A method of making overclad fiber optic coupler comprising providing a glass tube having a longitudinal bore and at least one funnel extending from said bore to a first end of said glass tube, inserting the bare portion of a first optical fiber into said tube bore, stripping coating from the end portions of a plurality of glass fibers, at least some of which are optical fibers, the coated portions of said plurality of fibers constituting pigtails, inserting one of said plurality of fibers into each of a plurality of feed tubes, disposing said plurality of feed tubes such that their ends are spaced from said first end of said glass tube and the stripped end portions of said fibers extend into said funnel, advancing said feed tubes toward said glass tube whereby said plurality of fibers advance further into said funnel, withdrawing said feed tubes away from said first end of said glass tube while simultaneously feeding said plurality of fibers from said feed tubes toward said glass tube, repeating the steps of feeding and withdrawing until the stripped end portions of said fibers are situated in said tube bore surrounding the bare portion of said first optical fiber, heating the assembly formed by the forgoing steps to collapse at least a portion of said glass tube onto the fibers therein, and stretching at least the midportion of the collapsed region of said glass tube to induce the coupling of optical signals between the uncoated fiber section and the stripped portions.

19. The method of claim 18 wherein the diameter of said bare portion of said first optical fiber is larger than the diameters of the stripped portions of said plurality of fibers.

20. The method of claim 18 wherein, during the insertion of said plurality of fibers into said tube bore, the end of said uncoated fiber section opposite said pigtail-type fiber is situated at the end of said tube.

21. The method of claim 18 wherein, during the steps of advancing and withdrawing, said feed tubes move a distance that is between 5 and 8 mm.

22. A fiber optic coupler comprising a first composite fiber including an uncoated fiber section having a diameter $d_2$ and a pigtail-type optical fiber of diameter $d_1$ being fused to at least one end of said fiber section, wherein $d_1$ is different from $d_2$, that portion of said pigtail-type optical fiber opposite said fiber section having protective coating thereon, at least one additional optical fiber having a coated fiber pigtail extending from at least one end thereof, said uncoated optical fiber section and said at least one additional optical fiber being optically fused together along a length sufficient to induce the coupling of optical signals between the uncoated fiber section and the stripped end portion of said at least one additional optical fiber.

23. The fiber optic coupler of claim 22 wherein said at least one additional fiber comprises a plurality of fibers surrounding said uncoated fiber section.

24. The fiber optic coupler of claim 22 wherein said at least one additional fiber comprises a plurality of fibers, and wherein said uncoated fiber section is surrounded by said plurality of fibers and at least one of said spacer fiber.

25. The fiber optic coupler of claim 22 wherein $d_2$ is greater than $d_1$, wherein said at least one additional fiber comprises eight fibers surrounding said uncoated fiber section.

26. The fiber optic coupler of claim 1 wherein said at least one additional optical fiber comprises a second composite fiber identical to said first composite fiber.

27. The fiber optic coupler of claim 26 wherein $d_2$ is greater than $d_1$ and wherein each of said first and second composite fibers comprises a pigtail-type optical fiber fused to both ends thereof.

* * * * *